(12) United States Patent
Stearns et al.

(10) Patent No.: US 6,193,213 B1
(45) Date of Patent: Feb. 27, 2001

(54) VARIABLE PRESSURE LOADING SYSTEM UTILIZING COMBINED SPRING AND FLUID PRESSURE

(75) Inventors: Stanley D. Stearns; Ales Plistil, both of Houston, TX (US)

(73) Assignee: Valco Instruments Company, Inc., Houston, TX (US)

( * ) Notice: Subject to any disclaimer, the term of this patent is extended or adjusted under 35 U.S.C. 154(b) by 0 days.

(21) Appl. No.: 09/264,376

(22) Filed: Mar. 5, 1999

(51) Int. Cl.[7] .................................................. F16K 3/16
(52) U.S. Cl. ....................... 251/175; 251/180; 137/625.46
(58) Field of Search ..................................... 251/175, 176, 251/180, 188, 192; 137/625.46

(56) References Cited

U.S. PATENT DOCUMENTS 3,040,777 * 6/1962 Carson et al. ........................ 251/175
4,550,742 * 11/1985 Stearns ................................... 137/14
5,971,020 * 10/1999 Raque et al. ..................... 137/625.11

* cited by examiner

Primary Examiner—John Fox
(74) Attorney, Agent, or Firm—Felsman, Bradley, Vaden, Gunter & Dillon, L.L.P.

(57) ABSTRACT

A variable load mechanism for use in a valve seals the flow of a switched fluid. The flow passes through the mechanism in a region which includes shear seal surfaces. The lives of the components of the valve are extended by limiting the range of excursion in response to valve seat forces. The valve element is provided with a first force from a stack of Bellville washers, for example. A second force acts on the valve element through the spring and is determined by fluid pressure.

25 Claims, 3 Drawing Sheets

VARIABLE PRESSURE LOADING SYSTEM UTILIZING COMBINED SPRING AND FLUID PRESSURE

BACKGROUND OF THE DISCLOSURE

The present disclosure sets out an improved variable load mechanism for use in a valve which seals the flow of a switched fluid by operation of the valve. The flow passes through the mechanism in a region which involves shear seal surfaces. These surfaces tend to wear with loading of the two members defining that switching mechanism. For sake of brevity, this will be defined as a moveable valve element cooperative with a valve body. There is relative motion between the two which must be accomplished, and this is accomplished under load.

As set forth in an earlier patent of the present inventor which is U.S. Pat. No. 4,550,742, a variable loading system for a shear seal valve mechanism was defined. In particular, that shows a variable load which is applied to the valve element.

This disclosure sets out a shear seal system useful in switching fluid flow. Especially where the fluid flow is subject to pressure peaks, this system is well able to accommodate fluctuations in the input pressure. Moreover, this system comprises a valve element which is spring loaded by a stack of Beliville washers which provide a controllable first force on the valve element. A second force is added for the valve element. The second force is hydraulically powered so that it increases or decreases with pressure. There is an input pressure chamber which adds a second force applied to the valve element thereby increasing the loading on the seals. The significance of this and its mode of operation will be given below. In general terms, the valve element and cooperative valve seat operate in a dry condition without liquid sealants. The element and seal involve a seal which prevents leakage out of that region. The seal is forced to operate in a dry condition because solvents and lubricants cannot be introduced into the region of the seal. Otherwise, they would mix with the switched fluids and thereby commingle with the switched fluid flow. Because this is involved in testing equipment, the quantities are small and any comingling of lubricant will create serious data distortion reported by test equipment connected to the valves of the present disclosure. Constant pressure applied to the valve element is not needed. Rather, the pressure for the seal is varied as much as possible to yet still obtain a safe and leak proof operation. As taught in the earlier disclosure, and especially referring to FIG. 2 thereof, the forces acting on the valve element assure a leak proof operation. They are made variable dependent on the pressure of fluid applied to the valve which prompts the valve element to vary loading and hence fluctuates with fluctuations in pressure. The loading occasioned by input pressure variations in the previous structure is dependent on the requirements to prevent leakage and that is dependent on the pressure of fluid which is to be switched.

That valve construction is quite successful. There is a limitation, however, on the life of the components. The present disclosure seeks to extend the life of the components by limiting somewhat the range of excursion in response to valve seat forces. In this version of equipment, the valve element is provided with a first force from a stack of Bellville washers. This spring force is defined by the geometry of the springs. The present system contemplates a first and fixed spring force acting on the valve element assisted by a second force acting on the valve element through the spring which is pressure fluid determined driven. The second force, however, has a limit which is implemented by control of valve element excrusion. More specifically, the valve element in this construction is a rotary valve element mounted on a stem or shaft. The stem is constructed so that a surrounding shoulder is confronted by the Bellville springs thereby confining the springs around the stem of the valve element. This applies the first or spring driven force against the valve element. In addition to that, the stem includes appropriate surrounding seals to define a pressure receiving chamber. The chamber is an annular chamber around the stem and enables a seal member to move in telescoping fashion in the chamber. In response to pressure fluid applied to it, the stem is moved, but its range of movement is limited by a set of interlocking shoulders. This therefore, limits the traverse or travel of the stem so that the range of travel is also limited. Moreover, when travel does occur in response to pressure fluid, it is implemented by pushing against the lower end of the Bellville spring. This adds the hydraulically originated force under the spring, and imparts more force to the same stem mounted valve element.

As will be explained in the description below, this mode of operation changes the loading of the valve element on the valve seat and therefore extends the life. Moreover, by providing this limit on the range of travel, overloading is prevented.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

DETAILED DESCRIPTION OF THE PREFERRED EMBODIMENT

Figure 1:
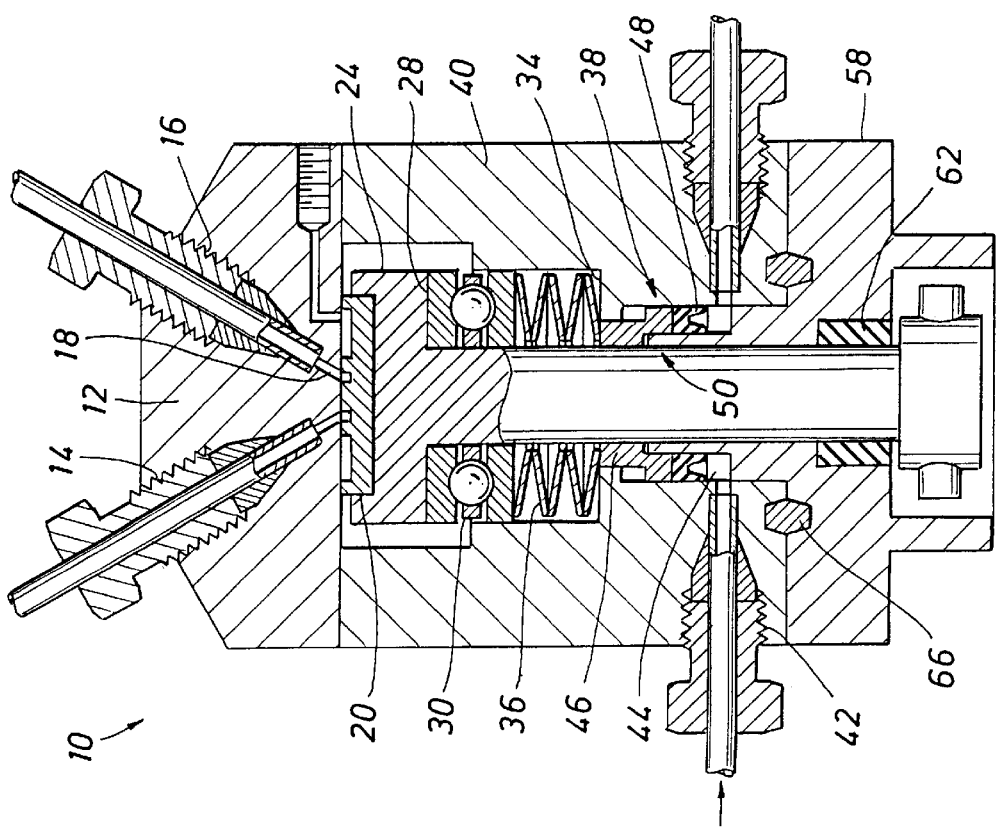
FIG. 1 is a sectional view of the shear seal valve system of the present disclosure provided with minimal hydraulic loadings so that the valve element and mounting stem are in the downward location.

Attention is first directed to FIG. 1 of the drawings where the numeral 10 identifies a variable shear seal loading system in a multiple port valve. Beginning at the top of the structure, a cap 12 is provided with first and second threaded openings 14 and 16 which connect with suitable lines and which provide fluid flow into or out of the sealing mechanism. Typically, the cap or head 12 supports several of these tapped openings so that two, four, six or more openings can be connected for switching. Commonly, this represents an even number of ports which are switched, although that is not a specific mandated requirement. Rather, the cap provides a structural area of sufficient size to receive any number of threaded or tapped openings which then permit construction of the lines 18 which are the small flow lines that communicate directly to the valve switching area. The lines 18 extend through the cap and emerge against the rotor 20. This is a disk member of careful construction having a flat face. The rotor 20 includes lands and grooves bearing against the head 12 for perfecting sealed and limited flow paths cooperative with on the opposite face. The head 12 has a set of grooves provided for that purpose in the bottom surface of the cap 12. The cap 12 is constructed with a planar surface, and that surface is made as flat to match the flat surface of the confronting rotor 20. The two are deployed parallel to each other. Facial contact is urged by the spring loading below the rotor as will be described, but that contact seals the channels between the two members. The loading force applied under the rotor 20 forces it against the cap 12 so that sealing is accomplished. That seal, however, is subject to leakage depending on the pressure of the fluids which are delivered through the passages 18. While low pressures can be confined, higher pressures tend to leak when the fluid pressure is too high. However, that leakage is limited by the increase in loading force applied to the valve seat of the present invention. Effectively, the ports connect to facially located grooves and lands The rotor 20 is a flat circular disk received in a mating and matching receptacle at the top end of a valve element 24. The valve element 24 defines the enlarged head connected with a smaller central mounting shaft on the concentric bottom face surrounded by the shoulder 28. The shoulder 28 is a downwardly facing shoulder which abuts a system delivering an upward force against the shoulder which loads the valve element. The shoulder 28 is an abutting surface for a ball bearing assembly 30 which has upper and lower races. The ball bearing assembly, just below the shoulder 28, is centered around a mounting shaft 32. The shaft 32 has a concentric construction to impart rotation to the rotor 20 as will be explained. The shaft 32 extends through and above an internal shoulder 34 to support a stack of Bellville washers captured in an internal chamber above the shoulder 34 and below the bearing assembly 30. The Beliville washers 36 are sufficient in number and force to provide the desired loading on the shoulder 28 for its operation.

The shaft 32 is received within a passage 38 which is internally formed in the valve body 40. The valve body 40 is covered by the cap, thereby confining the components that are positioned in the passage 38. The passage changes diameters at different locations to accommodate the components. At the upper end, it is larger to receive the rotatable valve element 24 which supports the rotor 20. It gets smaller adjacent to the bearing assembly 30 and is smaller again below the shoulder 34. This defines a chamber within the valve body 40 above the shoulder 34 to receive the Bellville washer spring system. This construction enables easy assembly prior to attaching the cap 12.

The valve body 40 supports a hydraulic system. An inlet port 42 is shown at the left. There is a communicated internal chamber 44 which is filled with pressure fluid (more about that later), the chamber 44 expanding to move a limit or stop ring 46. The limit ring is below the Bellville washer 36, and defines the top end of the fluid chamber which is sealed by a seal ring 48. The seal ring 48 prevents leakage of hydraulic fluid upwardly. Moreover, it transfers a loading force against the lock ring 46. Movement of the lock ring 46 will be denoted below. The seal ring has parallel inside and outside skirts which flare apart to improve the contact with both sides confining the seal ring. A common seal ring has an internal coil spring in it to give it shape.

Figure 4:
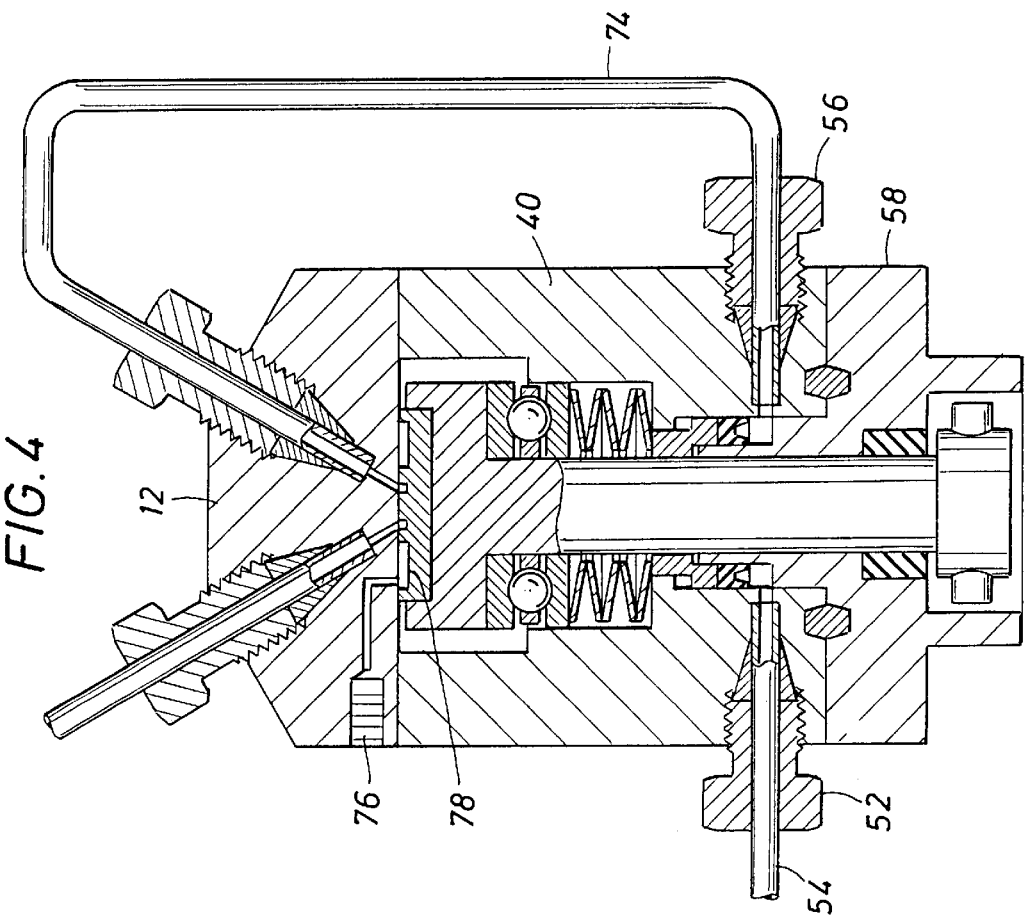
FIG. 4 is a view taken in the same plane as FIGS. 1 and 2 and showing a fluid flow connection which controlls pressure applied to the seal system.

In general terms, the foregoing describes a hydraulic force system 50. The system 50 communicates to an external fluid source which delivers the test fluid under pressure. It includes the fitting 52 connected with a tubing 54. The tubing 54 delivers fluid at a selected pressure, see the following discussion. Conveniently, flow can be delivered from the left to the right side as illustrated in FIG. 4 for a duplicated fitting 56 which is similar to the fitting 52 of the left. The left fitting of the two serves as a hydraulic fluid inlet and the other is the outlet. That can be changed because pressure fluid can be introduced at the left or right while pressure fluid can be removed from the opposite fitting. In either instance, reversed or swapped operation is permitted. Moreover, by provision of alternate ports as illustrated, difficult installations may be handled more readily. Operation of the hydraulic fluid and the results of changing pressure will be discussed. Specific pressure ranges for operation will also be given.

The valve body 40 is covered at the bottom by an plate of circular construction. The plate 58 is constructed with a centralized upstanding sleeve 60 which extends parallel to the drive shaft 32 and supports the seal 48. This confines pressure fluid below the seal 48. This keeps fluid from getting on the inside of the ring seal 48 and leaking along the shaft 32. The shaft 32 is sufficiently long to support a bushing 62 immediately adjacent to a coupling 64 to enable connection with a power source. The plate 58 seals the valve body 40 on concentric assembly and leakage between the two is prevented by a seal 66.

Figure 3:
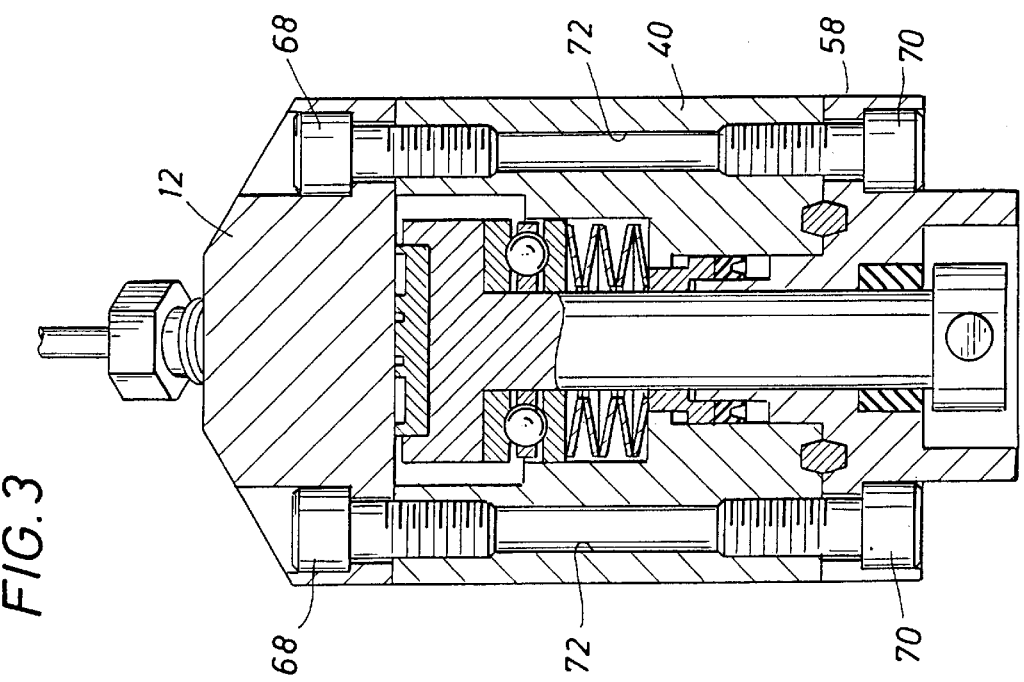
FIG. 3 of the drawings is a view at right angles to FIGS. 1 and 2 and shows a set of bolts assembling the head to the valve body.

Attention is now directed is now directed to FIG. 3 which shows assembly of the parts into the valve 10. This view is along a diameter to intersect body 40 to pull the components together. The bolts 68 anchor the cap or head at one end of the valve body 40 while the bolts 70 anchor the plate 58 to the lower end of the body 40. For convenience in fabrication; the body is drilled with a hole 72 which tapped with threads at the opposite ends to engage the threads on the bolts 68 and 70. The bolts are sized to fit in the threaded portion of the hole 72. The number of holes 72, and hence the number of bolts 68 and 70, is selected to adequately seal the two end components on the valve body with an increase in number with an increase in valve body 40 diameter.

FIG. 4 shows a flow line 74 enabling the pressure fluid to activate the seal system taught herein while the fluid flow is switched by valve action. FIG. 4 shows a drain passage 76 connected from an encircling leakage passage 78 around the switched facial channels to remove any leakage.

Operation of the hydraulic force system 50 should be considered. This forms a second force which is added to the force applied by the Bellville springs 36. Looking solely at the spring system, the springs are compressed, thereby applying a force to the shoulder 28. The springs are stationary so that rotation of the valve element is accomplished through the bearing assembly 30. This rotation enables switching of the valve. Rotation is normally a specified angle which is connected to the number of ports. Generally, if the valve includes more ports, they crowd around the cap and thereby reduce the angular deflection required to switch from one to another position. Moreover, this kind of system is force loaded by the springs to assure sealing against leaks of a specified pressure level. Assume, for example that the ports 14 and 16 are provided with fluids to switch at relatively low pressures. If the pressures are in the range of a few hundred psi, the Bellville springs are sufficient for the occasion. This fixed spring loading, while stiff and relatively high, does not load the moving parts in such a way that drag engendered by the rotor 20 acting against the cap and associated seals encounters excessive wear. Leakage is controlled and wear is held to a minimum. That may be adequate for many system pressure levels, but there are applications where the fluid pressures to be switched are quite high. As they become higher, it is necessary to enhance the fixed loading force applied to the system to thereby prevent leakage. To this end, two different loading forces have to be spoken of. One is the maximum fluid pressure achieved in the valve itself applied through the port 14 or the port 16 where a maximum pressure is encountered for switching. The switched pressure, at its maximum, defines the maximum pressure which is handled by the valve 10. At pressures up to about 1,000 psi, the springs only are sufficient. While this is a somewhat arbitrary set point, it helps accommodate a common range of pressures. The pressures handled by the valve 10 are preferably broken down into about three ranges. The first range is 0 to about 1,000 psi. Only spring force is sufficient. The second range is an intermediate range between about 1,000 and 4,000 psi. The third range is any pressure greater than that.

Figure 2:
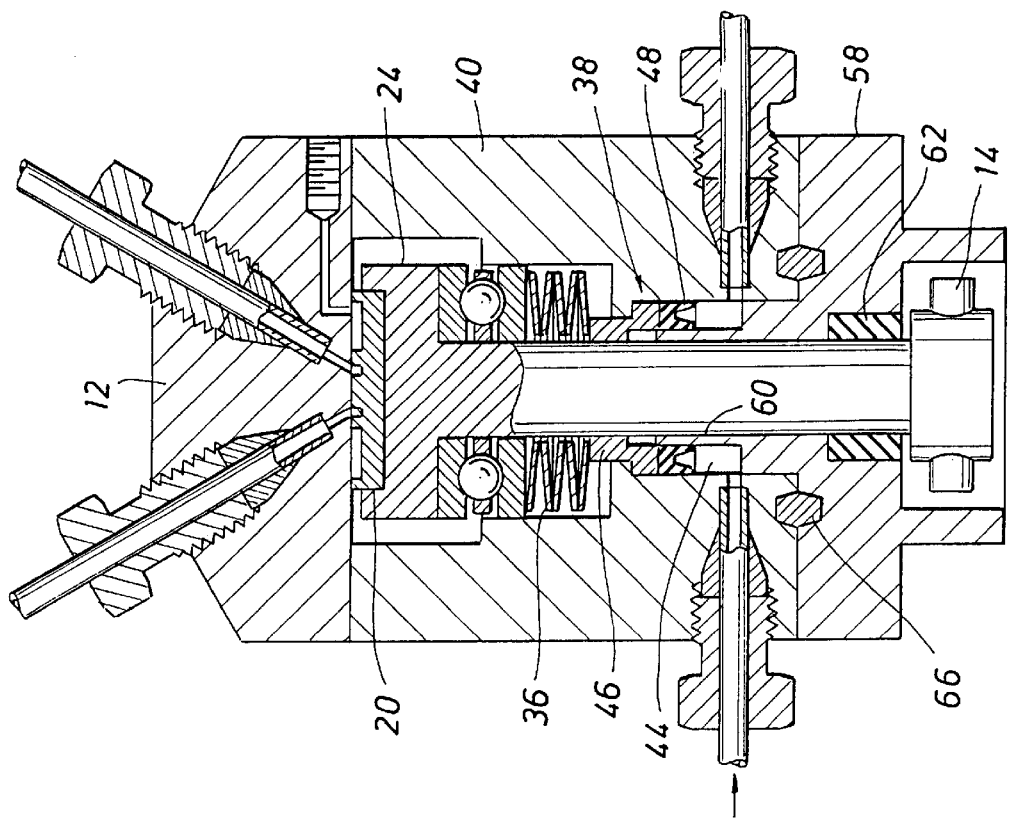
FIG. 2 is a view very similar to FIG. 1 showing the same structure, but it illustrates the position change accomplished by the application of hydraulic pressure in which a seal system is moved by a fixed distance to abut against a shoulder on the stem thereby limiting the applied axial loading for the seal system.

These different ranges of switched fluid pressures are involved in different modes of operation. As mentioned, the low pressure range involves only the spring force loading. The high pressure range involves the maximum of the spring force which can be applied along with the maximum of the hydraulic force applied through the hydraulic system 50. Explaining, fluid is introduced at a specified pressure, and that pressure is sufficient to move the ring seal 48 upwardly, thereby moving the lock ring above it. The seal 48 acts as a piston having inside and outside skirts on it to limit leakage as the piston moves up or down. The lock ring travel upwardly as illustrated in FIG. 2 which shows the contrast as a result of movement. It should be noted though that the lock ring which moves up cannot be moved any further. By limiting the upward travel of the lock ring, the hydraulically created force added to the spring force is incrementally added, but limited in magnitude. Restated, the maximum pressure range is all that can be reasonably applied to the system. Going beyond that, component failure may be encountered. Moreover, the components will wear excessively by permitting movement beyond that. Therefore, the lock ring moves upwardly, but limits response. Even if the hydraulic pressure applied behind the lock ring is higher, it cannot move any further. Moreover, the lock ring is deployed so that it is just under the Bellville springs. By this construction, the hydraulic force is added to the spring force. Both are applied under the shoulder 30.

Figure 5:
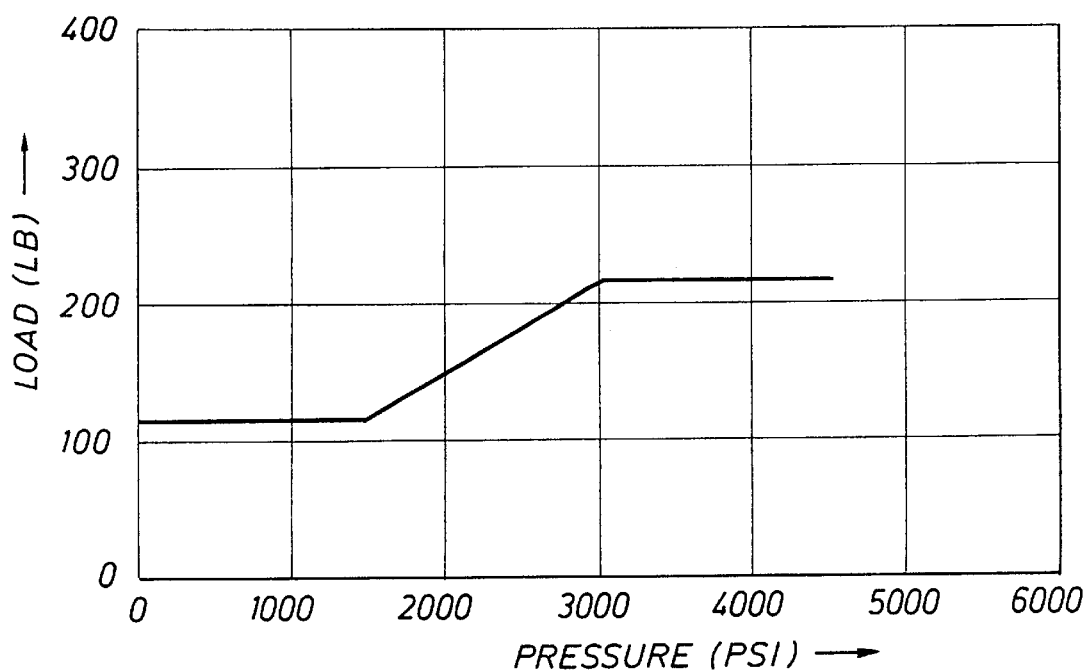
FIG. 5 is a graph showing spring load subject to hydraulic increase versus pressure in the system for a certain size valve body.
Figure 6:
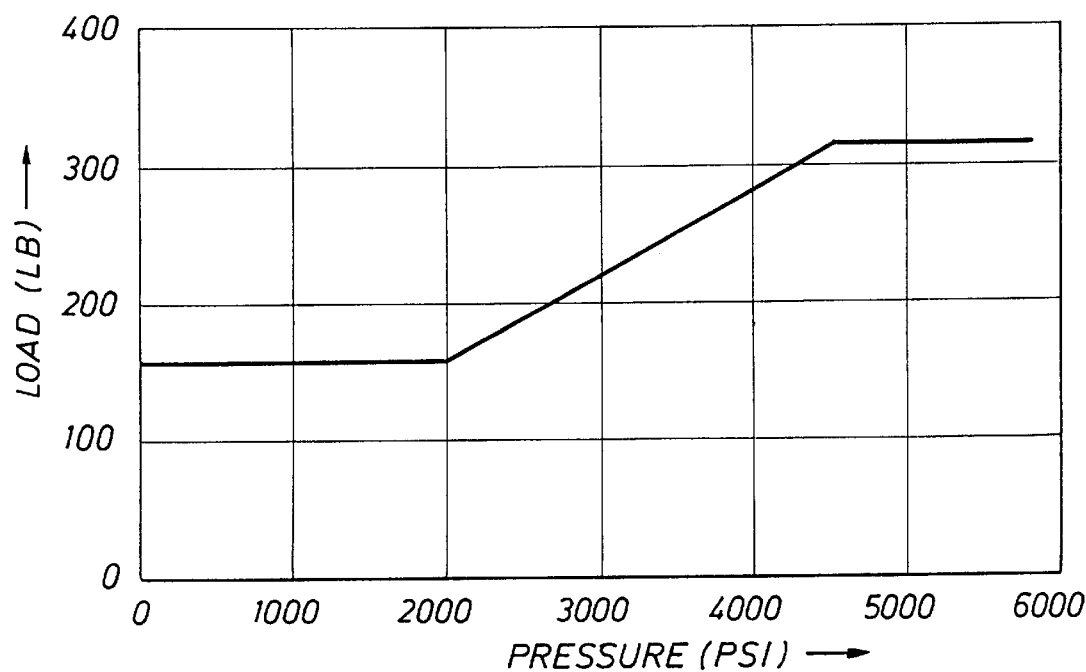
FIG. 6 is a graphs similar to FIG. 5 showing the same curve for a larger valve body.

There is an intermediate state of opration shown for two different sizes in FIGS. 5 and 6. The intermediate response involves partial movement of the lock ring 48 upwardly. If it moves any, it adds force to the Bellville springs. If it does, this is in response to some pressure applied between the set points defined for the high and low ranges in operation. To pick an example, shown in FIG. 5, assume that the lock ring 48 does not even move until at least 1,500 psi is exceeded. Assume also that the full range of travel is accomplished with 3,000 psi. By providing a pressure greater than 3,000 or less than 1,500 psi, the middle range is avoided. The operation of the system defines an intermediate range between these two values where movement is proportional to pressure. Such proportional movement has the advantage of providing a variable loading force to the rotor under the cap and thereby providing variable loading on the movable parts and especially the shear seals in the system.

The present system thus provides two forces to the shear seals, one which is fixed by virtue of spring geometry and strength and the other which is variable between two specific pressure adjusted points. In the example of FIG. 6, these pressures are 2,000 and 4,500 psi, which differ depending on the geometry of the system, height of the springs and so on. The variable tensioning system of this disclosure avoids raising the pressures so high and the shear seal forces so high that premature wear and damage results.

Operation of the system is repetitively carried out by simply installing the valve 10 to switch appropriate fluids in testing. The threaded ports 54 and 56 are used with suitably connected switching hydraulic pressures. They are often pressure regulated to assure that the pressure of hydraulic fluid forcing the valve element upwardly is adjusted in light of the pressures maintained at the ports 14 or 16.

While the foregoing is directed to the preferred embodiment, the scope is determined by the claims which follow:

What is claimed is:

1. An instrumentation valve comprising:
   (a) a valve body having a fluid flow passage therethrough cooperatively arranged relative to a valve seat;
   (b) a valve element adapted to be seated against said valve seat and having first and second operative positions, one position opening said fluid flow passage through said valve body for fluid flow and the other position switching said fluid flow passage, said housing enclosing said valve element therein against said valve seat;
   (c) valve element spring providing a relatively fixed force, said spring bearing against said valve element to relatively urge said valve element into sealing engagement with said valve seat to enable fluid flow up to a selected pressure to flow through said fluid flow passage and past said valve seat without leakage;
   (d) a fluid pressure responsive, pressure receiving chamber adapted to be connected to a source of fluid, said chamber further including a movable link to provide a variable force to said valve element responsive to the fluid source pressure to variably load said valve element as a function of the pressure of the fluid to be switched; and
   (e) said movable link includes a limit restricting the variable force between upper and lower force values.

2. The apparatus of claim 1 wherein said valve element spring is a Bellville spring.

3. The apparatus of claim 1 wherein said valve element is mounted on a shaft having an axis of rotation for said shaft, and further including a shaft shoulder coupling said fixed and variable forces to said shaft to urge said valve element into sealing contact with said valve seat.

4. The apparatus of claim 3 wherein said pressure receiving chamber encloses a sealable, annular movable piston, said piston having a specified cross-sectional area exposed to the pressure of fluid in said chamber and, said piston further moving toward said valve element to provide a variable force to said valve element within said force values.

5. The apparatus of claim 4 including an encircling seal ring around said piston rod.

6. The apparatus of claim 5 wherein said seal is a seal ring having spaced, parallel sealing skirts.

7. The apparatus of claim 1 including a shaft extending from said valve element is located adjacent to said chamber to apply the variable force to said valve element.

8. The apparatus of claim 1 wherein said movable link includes an interposed lock ring sealed around the periphery thereof by a floating seal, said seal providing fluid isolation.

9. The apparatus of claim 8 wherein said lock ring includes a pair of parallel and offset edges limiting travel.

10. An instrumentation valve comprising:
   (a) a body having a fluid flow passage therethrough, said body including an internal fluid pressure receiving chamber closed at one end by a cap;
   (b) a valve element cooperatively arranged relative to a valve seat, said valve element having first and second operative positions, one position opening said passage through said body for fluid flow and the other position closing said passage against fluid flow;
   (c) valve element bias spring mounted within said pressure receiving chamber providing a relatively fixed force, said bias spring bearing against said valve element to relatively urge said valve element into sealing engagement with said valve seat; and
   (d) a piston defining an isolated chamber adapted to be connected to a source of fluid so said isolated chamber provides a variable force to said valve element to variably load said valve element wherein said piston moves between two spaced limit shoulders.

11. The apparatus of claim 10 wherein said piston has a specified cross-sectional area exposed to the pressure of fluid in said pressure receiving chamber, and said ring further moves toward said valve element to increase the variable force on said valve element.

12. The apparatus of claim 11 wherein said ring moves to said limit shoulder.

13. An instrumentation valve comprising:
   (a) a multipart valve body having:
      (i) an outer body;
      (ii) a head closing said outer body; and
   (b) a fluid flow passage through said multipart valve body cooperatively arranged relative to a valve seat;
   (c) a valve element adapted to be seated against said valve seat and having first and second operative positions, one position opening said fluid flow passage through said valve body for fluid flow and the other position switching said fluid flow passage, said housing enclosing said valve element therein against said valve seat;
   (d) valve element spring providing a relatively fixed force, said spring bearing against said valve element to relatively urge said valve element into sealing engagement with said valve seat to enable fluid flow up to a selected pressure to flow through said fluid flow passage and past said valve seat without leakage;
   (e) a fluid pressure responsive, pressure receiving chamber adapted to be connected to a source of fluid, said chamber further including a movable link to provide a variable force to said valve element responsive to the fluid source pressure to variably load said valve element as a function of the pressure of the fluid to be switched; and
   (f) said movable link includes a limit restricting the variable force between upper and lower force values.

14. The apparatus of claim 13 wherein said valve element spring is a Bellville spring.

15. The apparatus of claim 13 wherein said valve element is mounted on a shaft having an axis of rotation for said shaft, and further including a shaft shoulder coupling said fixed and variable forces to said shaft to urge said valve element into sealing contact with said valve seat.

16. The apparatus of claim 15 wherein said pressure receiving chamber encloses a sealable, annular movable piston, said piston having a specified cross-sectional area exposed to the pressure of fluid in said chamber and, said piston further moving toward said valve element to provide a variable force to said valve element within said force valves.

17. The apparatus of claim 16 including an encircling seal ring around said piston rod.

18. The apparatus of claim 17 wherein said seal is a seal ring having spaced, parallel sealing skirts.

19. The apparatus of claim 13 including a shaft extending from said valve element is located adjacent to said chamber to apply the variable force to said valve element.

20. The apparatus of claim 13 wherein said movable link includes an interposed lock ring sealed around the periphery thereof by a floating seal, said seal providing fluid isolation.

21. The apparatus of claim 20 wherein said lock ring includes a pair of parallel and offset edges limiting travel.

22. The apparatus of claim 13 wherein said valve element is urged by said valve element spring against said valve seat to form a leak proof connection therewith, and further wherein said valve element spring and said fluid pressure responsive, pressure receiving chamber provide forces added to said valve element so that the valve element moves in response to the sum of the spring and variable forces applied thereto and the force is limited.

23. The apparatus of claim 22 wherein said fluid pressure responsive, pressure receiving chamber has a circular piston ring therein, and said ring is movable within limits.

24. The apparatus of claim 22 wherein said movable ring is adjacent to a seal member and said seal member is pressure actuated to seal against leakage from said chamber.

25. The apparatus of claim 13 wherein a variable force is formed by said pressure receiving chamber which is formed by introducing fluid flow into said chamber through a port formed in said valve body and further includes a fluid flow passage from said port into said chamber.

* * * * *